United States Patent [19]

Numata et al.

[11] 4,143,954
[45] Mar. 13, 1979

[54] LIGHT EMITTING INDICATOR FOR A CAMERA

[75] Inventors: Saburo Numata; Shinichiro Okazaki, both of Urawa, Japan

[73] Assignee: Fuji Photo Optical Co., Ltd., Omiya, Japan

[21] Appl. No.: 771,349

[22] Filed: Feb. 23, 1977

[30] Foreign Application Priority Data

Feb. 23, 1976 [JP] Japan .................................. 51-18611

[51] Int. Cl.$^2$ ............................................. G03B 7/08
[52] U.S. Cl. .................... 354/23 D; 354/50; 354/60 L
[58] Field of Search .................. 354/53, 54, 55, 56, 354/60 E, 60 L, 23 D, 50, 51

[56] References Cited
U.S. PATENT DOCUMENTS

| 3,860,936 | 1/1975 | Harvey | 354/53 X |
| 3,955,892 | 5/1976 | Numata et al. | 354/23 D X |

*Primary Examiner*—Michael L. Gellner
*Attorney, Agent, or Firm*—Harold L. Stults

[57] ABSTRACT

A light emitting indicator for a camera includes an absolute value circuit for increasing the brightness of the light emitting indicator element with decrease of the scene brightness when the scene brightness is below a predetermined level. Thus, the amount of light emitted from the light emitting indicator and falling on the photocell detector is increased to compensate for the undesired decrease of the total amount of light incident upon the photocell detector which would otherwise result in measurement of too low scene brightness. This increasing light from the indicator element precludes the setting of an undesirably extended period of exposure time.

6 Claims, 4 Drawing Figures

F I G. I

LIGHT EMITTING INDICATOR FOR A CAMERA

BACKGROUND OF THE INVENTION

1. Field of the Invention

This invention relates to a light emitting indicator for a camera, and particularly to a light emitting indicator for a camera which is so constructed that so long as the scene brightness is below a predetermined level, the brightness of the light emitting indicator means increases with the decrease of the scene brightness for the sake of compensation.

2. Description of the Prior Art

The performance of semiconductor devices used in the light measuring device in a camera, have been much improved so that they are increasingly sensitive to low brightness. In measuring brightness through the taking lens, which is a leading photometric technique for low scene brightness, the increasing sensitivity of the light measuring device sometimes adversely causes the setting of a period of exposure longer than can be met by the self-setting interlocking mechanism of the camera.

If the shutter is actuated in such an adverse condition, no significant pictures will be taken. When the exposure duration is set so that it takes too long a time, the person handling the camera sometimes wonders whether something is wrong with the camera. The same thing takes place if the shutter is released before the stable state has been reached because of the slow response of the light measuring circuit.

In an attempt to preclude these defects it has hitherto been proposed to connect a resistance across a photocell of the light measuring circuit. A second proposal is that the longest permissible exposure time be determined with reference to the logic sum of the output signal from the light measuring circuit and the output signal from a longest time determining circuit, which works independently of the light measuring circuit.

Connection of a resistance across the photocell has the disadvantage that the sensitivity of the light measuring circuit is badly reduced for low scene brightness. On the other hand, when the second proposal is attempted, the response speed of the light measuring circuit cannot be improved, and therefore the circuit is not stable in operation immediately after the circuit has been connected to the power supply. This is totally defective unacceptable in cameras in which the electric circuits are connected to the power supply when the shutter is released.

SUMMARY OF THE INVENTION

In view of the above defects, the primary object of this invention is to provide a light emitting indicator for a camera which is capable of increasing the brightness of the light emitting indicator means inversely with the scene brightness when the latter decreases below a predetermined level, thus finally improving the response speed at low brightness, and precluding setting an undesirably extended exposure time.

To attain this object, light emitting indicator means for presenting exposure information is positioned in front of a photocell detector in the optical path to the finder, and a brightness regulating circuit for causing the brightness of the indicator means to vary with the scene brightness, is used according to this invention so that when the scene brightness is below a certain predetermined level, the brightness of the indicator increases with the decrease of further scene brightness so as to cause an extra amount of light to emit from the indicator and to fall on the photocell to compensate for undesired decrease of light to the photocell, thus finally precluding the setting of an undesirably extended period of exposure time as a result of measuring the low scene brightness.

DESCRIPTION OF THE PREFERRED EMBODIMENTS

Figure 1:
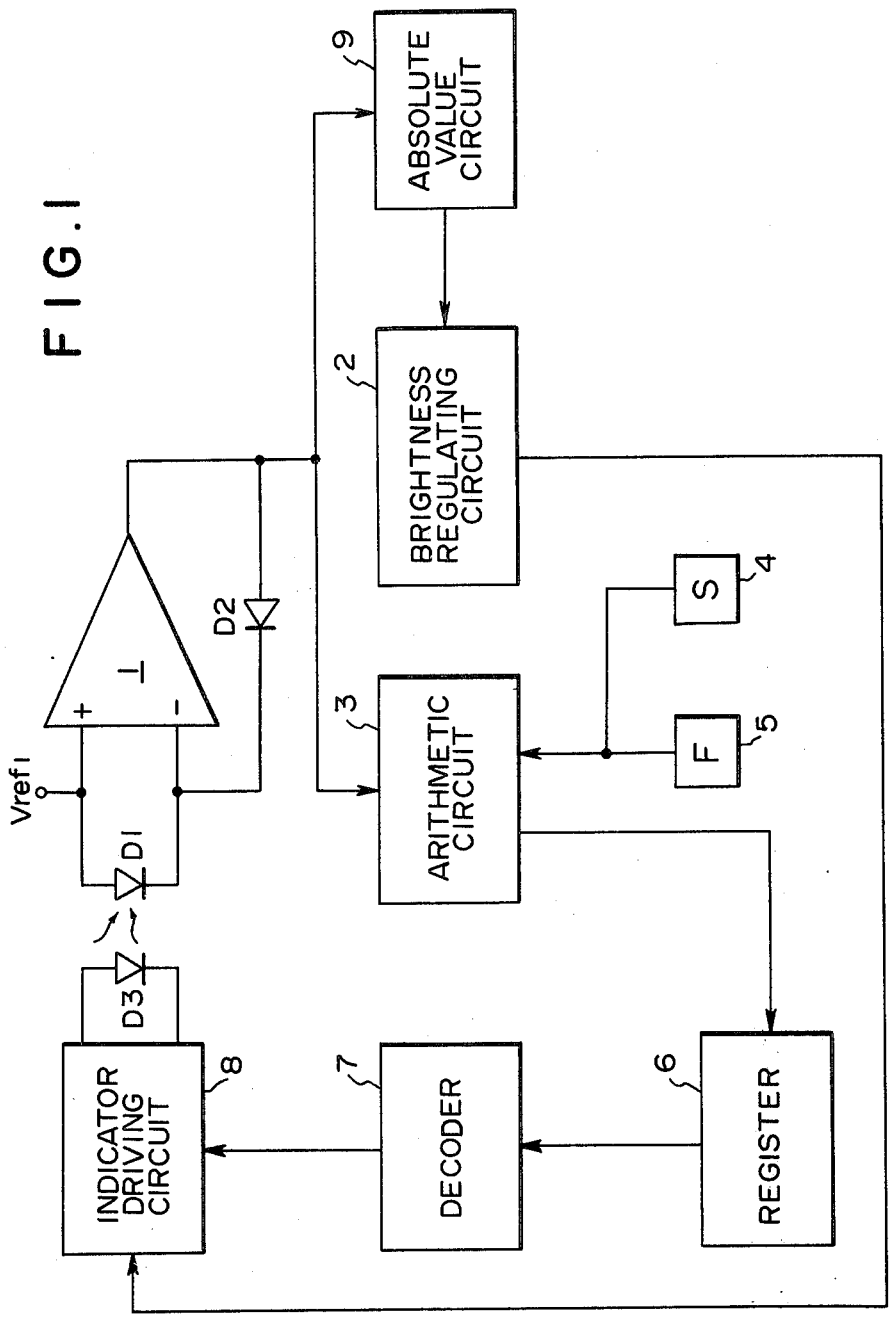
FIG. 1 is a block diagram showing one embodiment according to this invention.

Referring to FIG. 1, there is shown one embodiment of this invention which is applied to a shutter control circuit of a single-lens reflex camera capable of analogue light measuring and digital-displaying. A light measuring circuit 1 essentially comprises an operational amplifier constituting a log conversion circuit. As shown a photocell D1 is connected across the input terminals of the operational amplifier, and the inversion input terminal is connected to the output terminal via a log conversion diode D2 whereas the non-inversion input terminal is connected to the reference voltage source $Vref_1$. This constitutes a light measuring circuit.

A brightness regulating circuit 2 is responsive to the output of the light measuring circuit 1 for controlling the driving voltage and current of a light emitting indicator driving circuit 8 so as to modify the brightness of the light emitting indicator D3. The brightness regulating circuit 2 may be the one which changes brightness of the light emitting indicator D3 step by step. The photocell D1 is positioned behind the indicator D3 in the optical path of the view finder, as is well known.

An arithmetic circuit 3 determines the remaining factor, i.e., the shutter speed from the output of the light measuring circuit 1. Film sensitivity information 4 and diaphragm information 5 are arbitrarily set by the operator in consideration of the sensitivity of the photographic film used, the depth of an object to be photographed and other factors.

A register 6 together with a decoder 7 constitute an analogue-to-digital converter circuit, which converts the output of the arithmetic circuit 3 into a digital amount. This is displayed on the indicator D3 via the light emitting indicator driving circuit 8.

The part of the system of FIG. 1 mentioned so far constitutes a light emitting indicator which is responsive to the scene brightness for controlling the brightness of the light emitting indicator means D3. Such light emitting indicator per se is well known, and therefore detailed description thereof is omitted here.

An absolute value circuit 9 capable of controlling differently the output of the light measuring circuit 1 according to whether the output of circuit 1 reaches a certain predetermined level or not. In the embodiment as shown in FIG. 1, the output of the light measuring circuit 1 is sent to the brightness regulating circuit 2 via the absolute value circuit 9, as indicated by solid lines.

Figure 3:
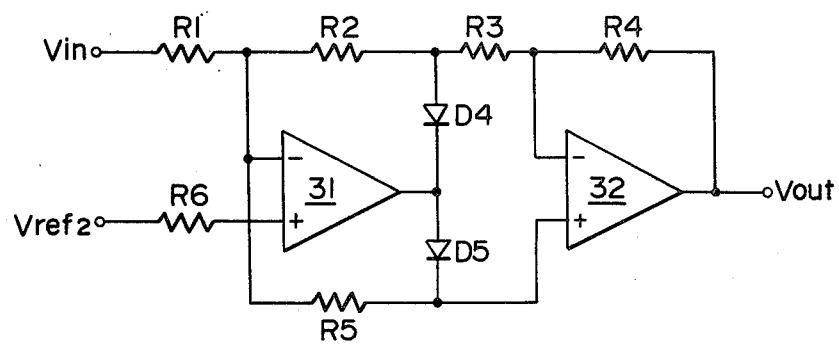
FIG. 3 shows an example of the absolute value circuit used in the embodiment of FIG. 1.

FIG. 3 shows the absolute value circuit 9 in greater detail. As shown in the drawing, the non-inversion terminal of the operational amplifier 31 is connected to the reference voltage source Vref$_2$ via a resistance R6. If the non-inversion terminal of the operational amplifier were grounded, it would be a conventional absolute value circuit.

Figure 4:
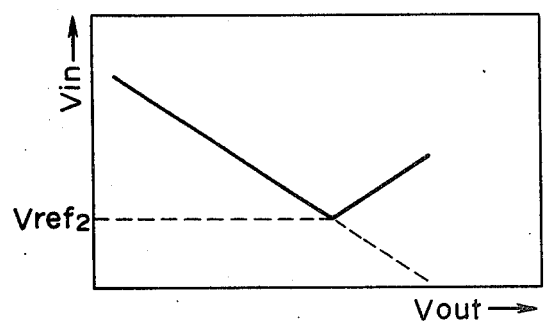
FIG. 4 is a graph showing the input-to-output characteristics of the absolute value circuit.

By applying a reference voltage Vref$_2$ to the non-inversion terminal of the operational amplifier 31 the input-to-output curve is shifted by the amount of the reference voltage Vref$_2$, as shown in FIG. 4. It should be noted that the absolute value circuit 9 is not limited to that as described and shown in FIG. 3 because a variety of modifications are possible. Therefore, the absolute circuit value of FIG. 3 should be understood as a preferred embodiment.

In operation of the system according to this invention, the photocell D1 is responsive to the scene brightness for providing the signal, which is applied to and is logarithmically compressed in the operational amplifier 1. The so-compressed signal representing the scene brightness is applied to the brightness regulating circuit 2 via the absolute value circuit 9.

So long as the scene brightness is above a predetermined level, the absolute value circuit 9 will provide an output signal which is proportional to an input signal representing the scene brightness. Therefore, the indicator driving circuit 8, which is controlled by the brightness regulating circuit 2, causes the brightness of the light emitting indicator element D3 to vary proportionally with the scene brightness. This linear action will be effective to reduce the adverse effect by the light from the indicator element D3 on the photocell D1 in measuring the scene brightness.

The light emitting indicator means D3 shows, for instance, the shutter speed which is determined by the arithmetic circuit 3.

Figure 2:
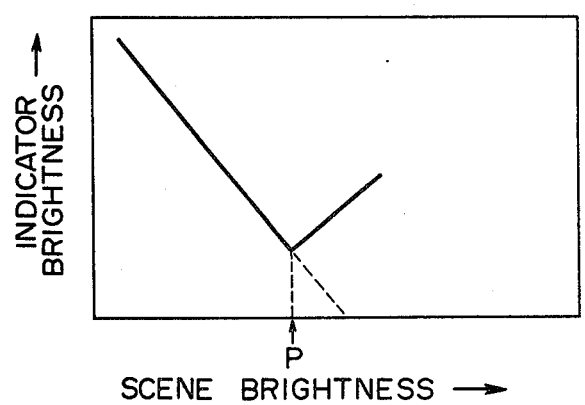
FIG. 2 is a graph showing the relation between the brightness of the light emitting indicator and the scene brightness.

If the output signal from the light measuring circuit, particularly from the operational amplifier 1 is below the predetermined level (See point "P" in FIG. 2), the absolute value circuit 9 causes the output signal to vary inversely with the scene brightness with the result that the brightness of the indicator element D3 increases.

With the arrangement as mentioned above, if the scene brightness is below a certain predetermined brightness, as for instance below 30 sec given in terms of the shutter speed, the photocell D1 is exposed to a proper extra amount of light from the indicator means D3, thereby determining the exposure time within the permissible length. As is apparent from the above, if the scene brightness is below a certain predetermined level, the device according to this invention allows the brightness of the light emitting indicator means to increase inversely with the decrease of the scene brightness, thus exposing the photocell to a proper extra amount of light from the light emitting indicator for raising the response speed of the light measuring circuit. The light emitting indicator system constructed as described shows a high performance over the conventional ones.

We claim:

1. In a camera comprising a view finder, a photocell positioned in the optical path of the view finder, light emitting indicator means visible in the view finder for displaying exposure information, and circuit means connected to the photocell to receive therefrom an electrical signal according to light reaching the photocell and connected to the light emitting indicator means to control the operation thereof in accordance with the electrical signal, a control system in which: the indicator means is located relative to the photocell to permit light from the indicator means to shine on the photocell, and the circuit means comprises means to cause the brightness of the light emitting indicator means to decrease with decreasing scene brightness down to a predetermined level of scene brightness and to increase in response to further decrease of scene brightness below said predetermined level to compensate for the undesired decrease of the amount of light from the scene to the photocell, thereby precluding the setting of an exposure longer than approximately the exposure corresponding to said predetermined level of scene brightness.

2. A control system for a camera according to claim 1 wherein said circuit means comprises a brightness regulating circuit and said means to increase the brightness of the indicator means with further decrease of the scene brightness below said predetermined level comprises an absolute value circuit for controlling the output from the photocell representing the scene brightness with reference to said predetermined level, said absolute value circuit being connected to said circuit means to increase the brightness of said light emitting indicator as a function of the absolute value of the difference between the scene brightness and said predetermined level.

3. A control system according to claim 2 in which said circuit means comprises control circuit means connected to the photocell to be controlled by the output therefrom, the light emitting indicator means comprises numeral-shaped light emitting means connected to the control circuit means to cause numerals to be illuminated in the light emitting means according to the output from the photocell and connected to said brightness regulating circuit to have the brightness of the light from the numeral-shaped light emitting means controlled thereby.

4. A control system according to claim 3 comprising a light measuring circuit connecting the output of the photocell to the control circuit and the absolute value circuit in parallel.

5. A control system according to claim 2 comprising a log conversion circuit connecting the photocell to the absolute value circuit.

6. A control system according to claim 2 in which the absolute value circuit comprises a first operational amplifier circuit comprising an output terminal, an inversion input terminal, and a non-inversion input terminal; a reference voltage source connected to the non-inversion input terminal being connected to the photocell to be controlled by the output therefrom, the input-to-output relationship from the inversion input terminal to the output terminal being controlled by the amount of reference voltage applied to the non-inversion input terminal.

* * * * *